United States Patent
Jang

(10) Patent No.: US 9,616,880 B2
(45) Date of Patent: Apr. 11, 2017

(54) SHIFT CONTROL METHOD FOR PREVENTING STARTING STAGE IMPLEMENTATION FAILURE OF HYBRID ELECTRIC VEHICLE

(71) Applicant: Hyundai Motor Company, Seoul (KR)

(72) Inventor: Sang Pil Jang, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/700,394

(22) Filed: Apr. 30, 2015

(65) Prior Publication Data

US 2016/0152228 A1   Jun. 2, 2016

(30) Foreign Application Priority Data

Dec. 1, 2014  (KR) .......................... 10-2014-0169831

(51) Int. Cl.
| | | |
|---|---|---|
| *B60W 20/30* | (2016.01) | |
| *B60W 10/02* | (2006.01) | |
| *B60W 10/08* | (2006.01) | |
| *B60W 10/10* | (2012.01) | |
| *B60W 10/06* | (2006.01) | |
| *B60W 10/11* | (2012.01) | |
| *B60W 30/18* | (2012.01) | |

(Continued)

(52) U.S. Cl.
CPC ............ *B60W 20/30* (2013.01); *B60W 10/02* (2013.01); *B60W 10/06* (2013.01); *B60W 10/08* (2013.01); *B60W 10/11* (2013.01); *B60W 30/18018* (2013.01); *B60W 30/18027* (2013.01); *B60W 30/18054* (2013.01); *B60W 30/19* (2013.01); *F16H 61/04* (2013.01); *B60W 2520/04* (2013.01); *B60W 2710/021* (2013.01); *B60W 2710/081* (2013.01); *B60W 2710/1005* (2013.01); *B60Y 2400/71* (2013.01); *Y10S 903/93* (2013.01)

(58) Field of Classification Search
CPC ...... B60W 20/30; B60W 10/08; B60W 10/02; B60W 10/10; B60W 2710/081; B60W 2710/1005; B60W 2710/021; B60W 30/19; B60W 10/06; B60W 30/18054; B60W 30/18027; B60W 30/18018; B60W 10/11; B60W 2520/04; Y10S 903/93; F16H 61/04; B60Y 2400/71
USPC ........................................................ 701/22
See application file for complete search history.

(56) References Cited

U.S. PATENT DOCUMENTS

| 2007/0225113 A1 | 9/2007 | Ogata | |
|---|---|---|---|
| 2012/0115674 A1* | 5/2012 | Ikegami | B60K 6/36 477/3 |

FOREIGN PATENT DOCUMENTS

| JP | 2006-70911 A | 3/2006 |
|---|---|---|
| JP | 2007-255566 A | 10/2007 |

(Continued)

*Primary Examiner* — Brian P Sweeney
(74) *Attorney, Agent, or Firm* — Morgan, Lewis & Bockius LLP

(57) ABSTRACT

A shift control method for preventing a starting stage implementation failure of a hybrid electric vehicle may include operating a driving motor included in the hybrid electric vehicle to have an RPM of the driving motor in a predetermined range, operating an automatic manual transmission (AMT) included in the vehicle to implement a starting stage, and operating the driving motor to allow the AMT to implement a neutral stage and a clutch gear restricted to an input shaft of the AMT to rotate up to one gear tooth when the starting stage is not implemented.

8 Claims, 6 Drawing Sheets

(51) Int. Cl.
 *B60W 30/19* (2012.01)
 *F16H 61/04* (2006.01)

(56) References Cited

FOREIGN PATENT DOCUMENTS

| KR | 2012-0062340 A | 6/2012 |
|---|---|---|
| KR | 10-1294089 B1 | 8/2013 |
| KR | 10-1449166 B1 | 10/2014 |

* cited by examiner

SHIFT CONTROL METHOD FOR PREVENTING STARTING STAGE IMPLEMENTATION FAILURE OF HYBRID ELECTRIC VEHICLE

CROSS-REFERENCE TO RELATED APPLICATION

The present application claims priority of Korean Patent Application Number 10-2014-0169831 filed on Dec. 1, 2014, the entire contents of which are incorporated herein for all purposes by this reference.

FIELD OF INVENTION

The present invention relates to a shift control method for preventing a starting stage implementation failure of a hybrid electric vehicle, and more particularly, to a shift control method for preventing a starting stage implementation failure of a hybrid electric vehicle capable of solving a starting stage implementation phenomenon which may occur when the vehicle having a driving motor provided between an engine and a transmission stops and then starts.

BACKGROUND OF INVENTION

As illustrated in FIG. 1, a hybrid driving system which is applied to a commercial hybrid electric vehicle (HEV) is configured to include an engine 1, a clutch actuator 2, a driving motor 3, and automatic manual transmission (AMT) 4. The AMT 4 has a structure in which an automatic shift actuator 5 is mounted in the existing manual transmission and a clutch automatic release unit is mounted therein.

The AMT-HEV (hybrid electric vehicle in which the automatic manual transmission is mounted) 6 stops an engine at the time of stopping and re-starts the engine 1 with the driving motor 3 which is directly connected to an input shaft of the AMT 4 at the time of re-starting. To re-start the engine 1, the AMT 4 maintains a neutral state. After the engine 1 re-starts, the AMT 4 is in a starting stage state and the hybrid electric vehicle starts with power generated from the driving motor 3 as a driving force.

However, as illustrated in FIG. 2, when the vehicle stops and then re-starts, teeth of a clutch gear 8 which are formed at a gear 7 implementing the starting stage of the AMT 4 and teeth of a synchronizer sleeve 9 form a straight line and thus the gear 7 is not engaged with the synchronizer 11 but the teeth of the clutch gear 8 collide with the teeth of the synchronizer sleeve 9, such that a blocking phenomenon that a gear engagement fails may occur.

The information disclosed in this Background section is only for enhancement of understanding of the general background of the invention and should not be taken as an acknowledgement or any form of suggestion that this information forms the prior art already known to a person skilled in the art.

SUMMARY

The present disclosure has been made to solve the above-mentioned and/or other problems occurring in the prior art while advantages achieved by the prior art are maintained intact.

An aspect of the present disclosure provides a shift control method for preventing a starting stage implementation failure of a hybrid electric vehicle to prevent a blocking phenomenon which may occur when an AMT-HEV stops and then starts, by controlling a driving motor.

According to various aspects of the present disclosure, there is provided a shift control method for preventing a starting stage implementation failure of a hybrid electric vehicle which is equipped a driving motor and an automatic manual transmission (AMT). The shift control method may include operating the driving motor so that a clutch gear restricted to an input shaft of the AMT rotates up to one gear tooth when the hybrid electric vehicle stops and then re-starts and if a starting stage of the AMT is not implemented.

According to some aspects of the present disclosure, a shift control method may include: operating a driving motor included in the hybrid electric vehicle to have an RPM of the driving motor in a predetermined range; operating an automatic manual transmission (AMT) included in the vehicle to implement a starting stage; and operating the driving motor to allow the AMT to implement a neutral stage and a clutch gear restricted to an input shaft of the AMT to rotate up to one gear tooth when the starting stage is not implemented.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and/or other objects, features and advantages of the present disclosure will be more apparent from the following detailed description taken in conjunction with the accompanying drawings.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
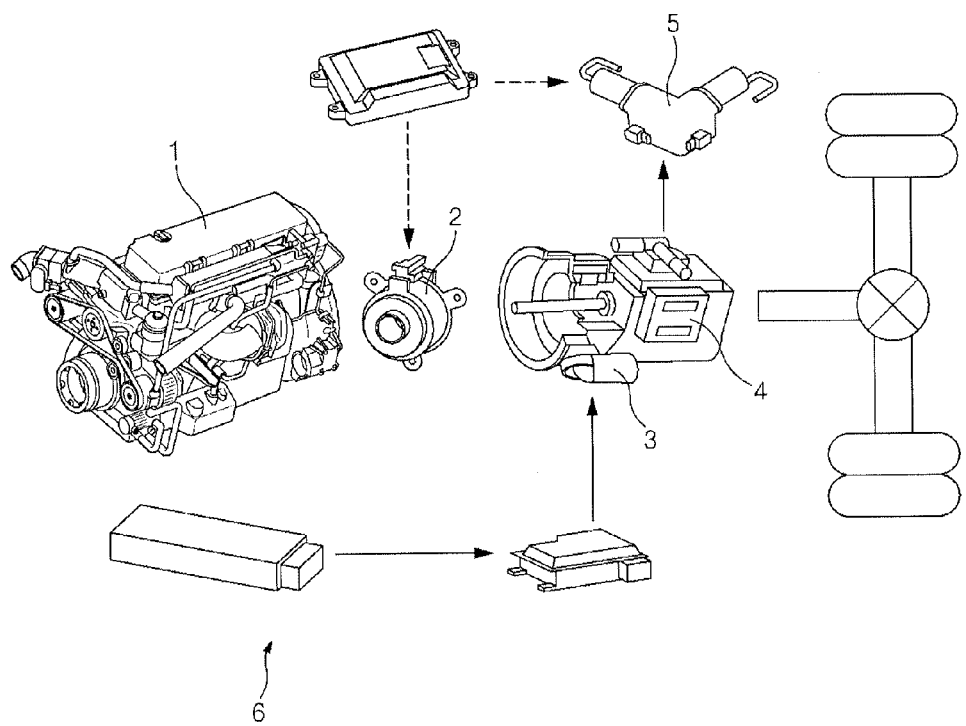
FIG. 1 is a schematic diagram of a driving system of the existing AMT-HEV.
Figure 2:
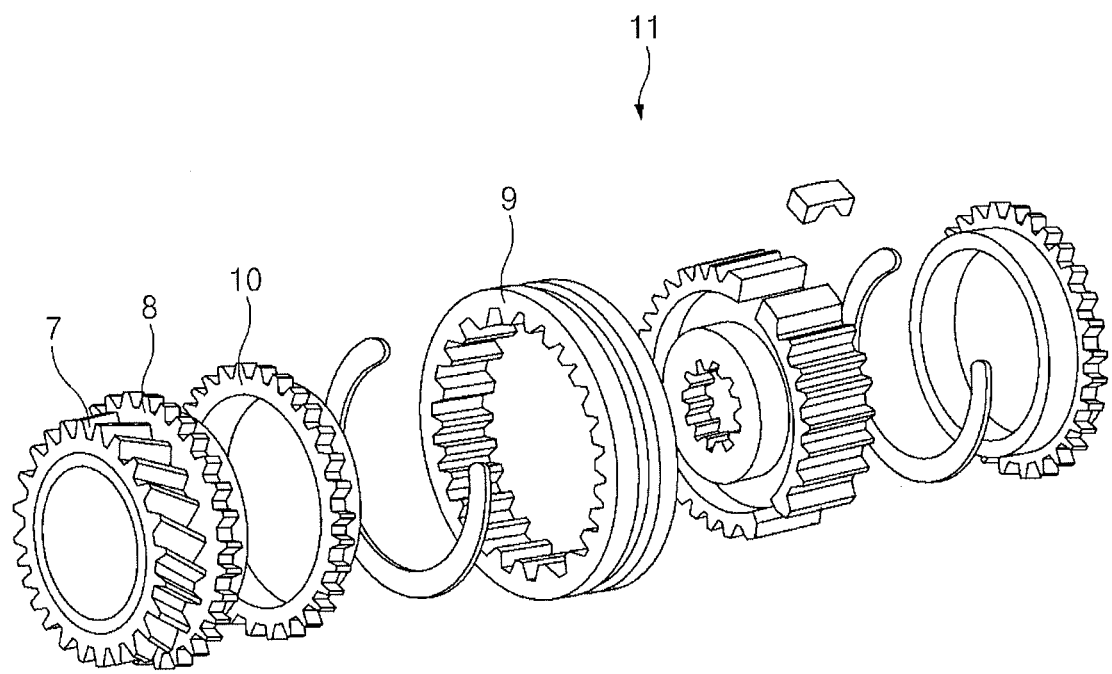
FIG. 2 is an exploded perspective view of main parts of the existing manual transmission.
Figure 3:
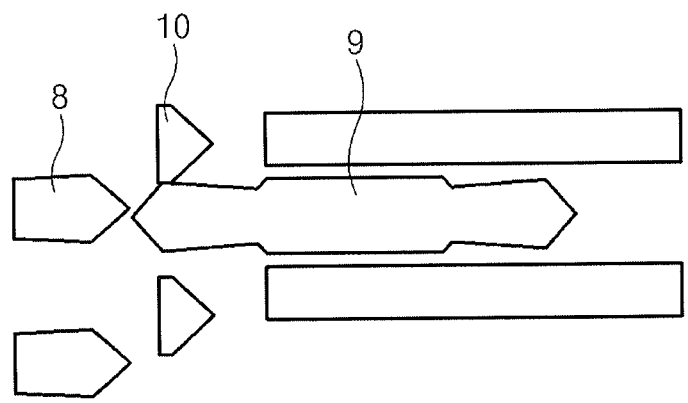
FIG. 3 is an exemplified diagram of a blocking phenomenon of the existing AMT-HEV.

As illustrated in FIGS. 2 and 3, the blocking phenomenon occurs when a synchronizer sleeve 9 is synchronized with a clutch gear 8 through a synchronizer ring 10 but teeth of a clutch gear 8 and teeth of the synchronizer sleeve 9 form a straight line and thus collide with each other.

Figure 4:
FIG. 4 is a graph illustrating a change in RPM, torque, and stroke of a driving motor at the time of the occurrence of blocking.

In this case, as illustrated in FIG. 4, a moving of a stroke 12 of the AMT, that is, the synchronizer sleeve 9 is shorter than a normal value and the movement thereof is repeated several times to implement the starting stage. Further, since the synchronizer sleeve 9 repeatedly contacts the driving motor 3, more accurately, the clutch gear 8 restricted to the input shaft so as to implement the starting stage, an RPM 13 of the driving motor 3 is changed without being maintained at an appropriate value.

In this case, a torque 14 transferred from the driving motor 3 to the input shaft is constantly maintained. In more accurately, the torque 14 which is provided in the state in which the driving motor 3 stops is 0 at the figures. That is, a rotation synchronization of the clutch gear 8 and the synchronizer sleeve 9 by the synchronizer ring 10 is broken and thus a torque which may more rotate any one of them is not provided.

In consideration of this, according to some exemplary embodiments of the present disclosure, when the starting stage of the AMT 4 is not implemented, the driving motor 3 is operated so that the clutch gear 8 restricted to the input shaft of the AMT 4 rotates as much as one gear teeth of the clutch gear 8. A more detailed description thereof will be provided below.

Figure 5:
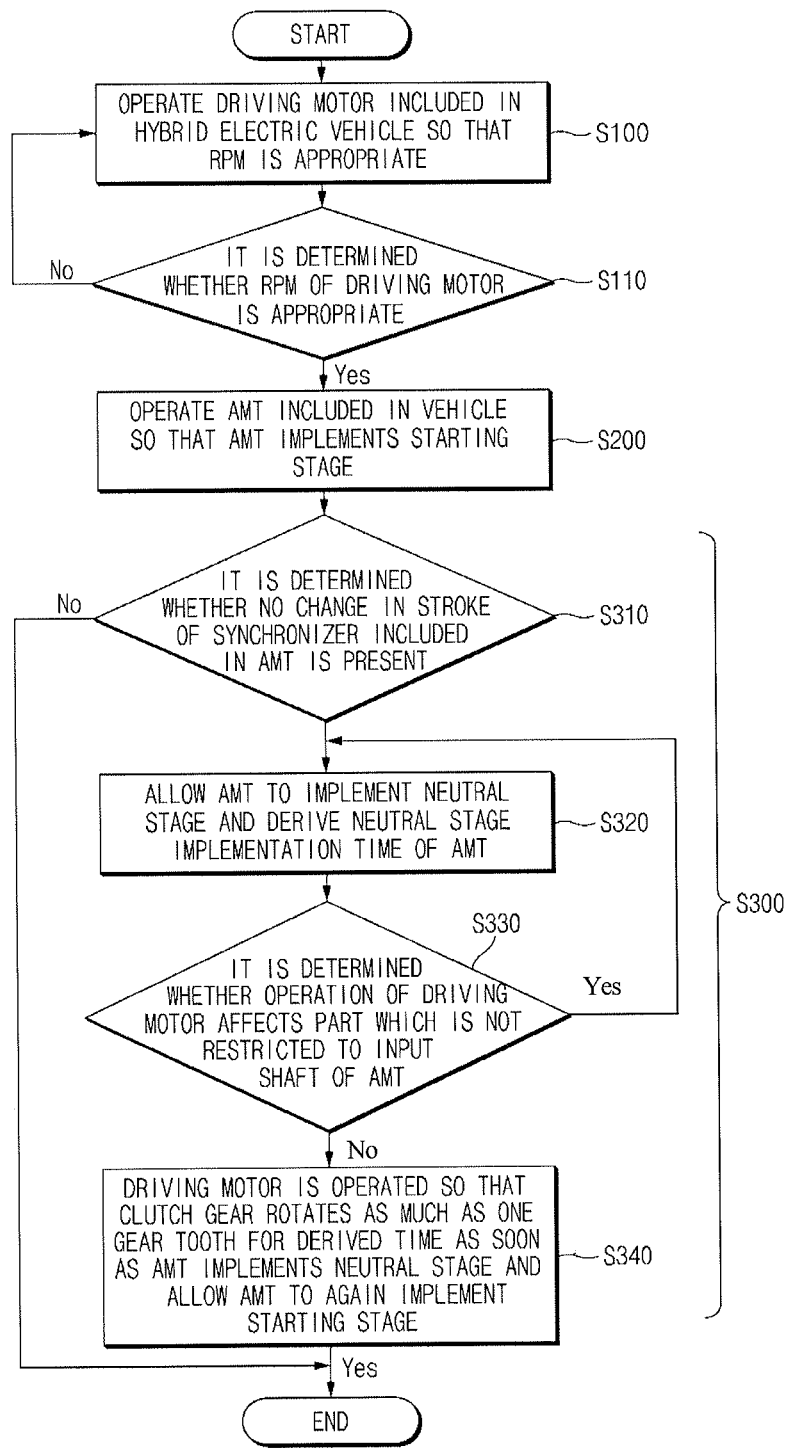
FIG. 5 is a procedure diagram of a shift control method for preventing a starting stage implementation failure of a hybrid electric vehicle according to some exemplary embodiments of the present disclosure.
Figure 6:
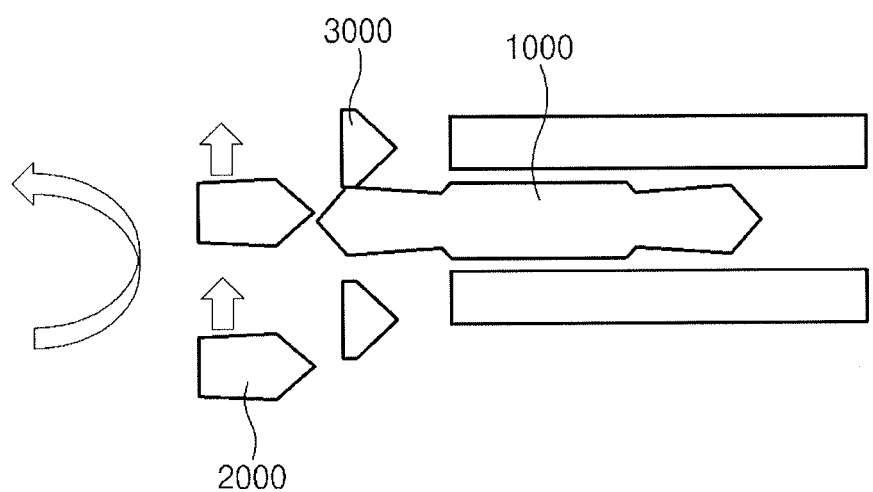
FIG. 6 is an exemplified diagram of a state in which the blocking phenomenon is solved, according to the shift control method for preventing a starting stage implementation failure of a hybrid electric vehicle of FIG. 5.
Figure 7:
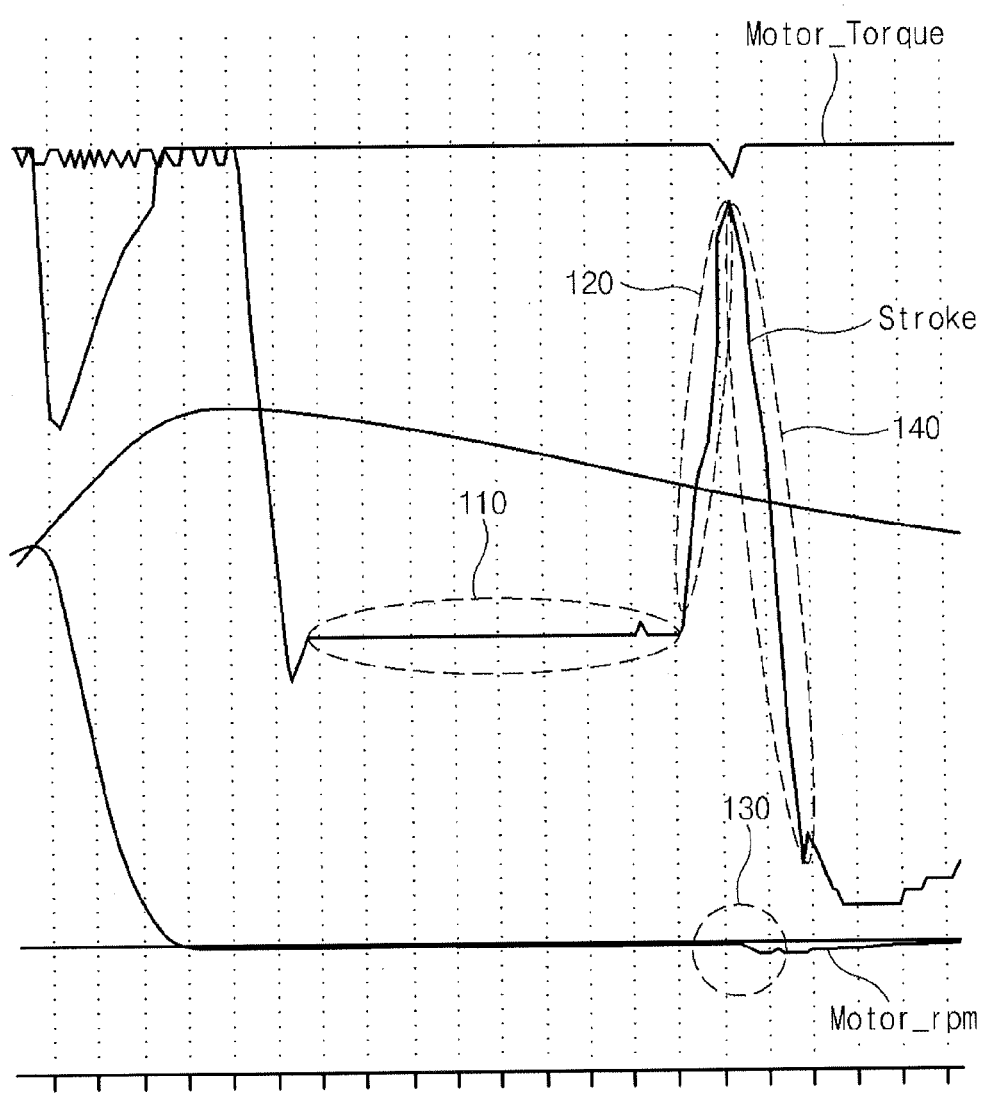
FIG. 7 is a graph illustrating the change in RPM, torque, and stroke of a driving motor in the state in which the blocking phenomenon is solved, according to the shift control method for preventing a starting stage implement failure of a hybrid electric vehicle of FIG. 5.

As illustrated in FIGS. 5 to 7, a shift control method for preventing the starting stage implementation failure of the hybrid electric vehicle according to some exemplary embodiments of the present disclosure includes operating the driving motor which is included in the hybrid electric vehicle so that the RPM is appropriate (S100), operating the automatic manual transmission (AMT) which is included in the vehicle to implement the starting stage (S200), and operating the driving motor to allow the AMT to implement a neutral stage and the clutch gear 3000 restricted to the input shaft to rotate as much as one gear tooth when the starting stage is not implemented (S300).

It is determined whether the RPM of the driving motor is an appropriate value or in a predetermined range (S110) and when the RPM is an appropriate value (for example, 0 as shown in the figures) or in a predetermined range, the synchronizer included in the AMT is operated so that the AMT implements the starting stage. It is determined whether change amount of a stroke of the synchronizer included in the AMT is not present (S310). If it is determined that no change amount of the stroke of the synchronizer is present, it is determined that the starting stage is not implemented. Further, when the starting stage is not implemented, it is determined that teeth of synchronizer sleeve 1000 forming the synchronizer form a series with teeth of the clutch gear 3000.

According to some exemplary embodiments of the present disclosure, if it is determined that the starting stage is not implemented, as described above, the AMT implements the neutral stage. Simultaneously with this, a time for the AMT to implement the neutral stage is derived (S320).

Further, according to some exemplary embodiments of the present disclosure, it is determined that the operation of the driving motor affects parts which are not restricted to the input shaft among parts of the AMT in the state in which the AMT implements the neutral stage (S330).

If it is determined that the operation of the driving motor affects the parts which are not restricted to the input shaft among the parts of the AMT, the driving motor is not operated and the AMT again implements the neutral stage. When the AMT again implements the neutral stage, the synchronizer sleeve included in the AMT is far away from the clutch gear 3000.

If it is determined that the operation of the driving motor does not affect the parts which are not restricted to the input shaft among the parts of the AMT, the AMT again implements the starting stage as soon as the AMT implements the neutral stage. Simultaneously with this, the driving motor is operated so that the clutch gear 3000 rotates as much as one gear tooth for the derived time (S340).

The shift control method for preventing the starting stage implementation failure of the hybrid electric vehicle according to some exemplary embodiments of the present disclosure configured as described above, as described above, if the starting stage of the AMT is not implemented when the hybrid electric vehicle mounted with the AMT stops and then re-starts, the driving motor is operated so that the clutch gear 3000 restricted to the input shaft rotates as much as one gear tooth.

As illustrated in FIG. 7, if it is determined that the change amount of the stroke of the synchronizer sleeve 1000 is small and thus the starting stage of the AMT is not implemented (110), the AMT implements the neutral stage (120). In this case, the time for the AMT to implement the neutral stage is derived and the driving motor is operated for time derived as an RPM of a previously calculated driving motor, that is, an RPM which may rotate the clutch gear 3000 as much as one gear tooth (130). The AMT is operated to implement the starting stage again while implementing the neutral stage of the AMT (140).

As illustrated in FIG. 6, the driving motor is operated so that the clutch gear 3000 rotates as much as one gear tooth of the clutch gear 3000 while the synchronizer sleeve 1000 moves to be engaged with the clutch gear 3000 when the synchronizer sleeve 1000 is in a neutral state, the teeth of the synchronizer sleeve 1000 are not engaged with the teeth of the clutch gear 3000, such that the blocking which occurs due to the teeth of the synchronizer sleeve 1000 and the teeth of the clutch gear 3000 which form a straight line may be solved and the synchronizer sleeve 1000, the synchronizer ring 2000, and the clutch gear 3000 are engaged with each other to implement the starting stage.

As described above, according to the shift control method for preventing a starting stage implementation failure of a hybrid electric vehicle according to the exemplary embodiments of the present disclosure, even though the blocking phenomenon occurs when the AMT-HEV stops and then re-starts after the engine re-starts, the clutch gear restricted to the input shaft rotates as much as one gear tooth and the teeth of the clutch gear are not engaged with the teeth of the synchronizer sleeve, such that the blocking phenomenon which occurs due to the teeth of the clutch gear and the teeth of the synchronizer sleeve which form a straight line may be solved.

Further, the idle stop and go (ISG) function of turning off the engine starting when the AMT-HEV stops may be unused due to the blocking phenomenon; however, according to the exemplary embodiments of the present disclosure, the blocking phenomenon is solved and therefore the use of the ISG function is expected to be increased, thereby more improving the fuel efficiency of the AMT-HEV.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method for preventing a starting stage implementation failure of a hybrid electric vehicle, the shift control method comprising:
    operating a driving motor included in the hybrid electric vehicle to have an RPM of the driving motor in a predetermined range;
    operating an automatic manual transmission (AMT) included in the vehicle to implement a starting stage;
    operating the driving motor to allow the AMT to implement a neutral stage and a clutch gear restricted to an input shaft of the AMT to rotate up to one gear tooth when it is determined by a controller that the starting stage is not implemented; and
    deriving a time for the AMT, by the controller, to implement the neutral stage,
    wherein in a state in which the AMT implements the neutral stage, the driving motor is operated so that the clutch gear rotates up to the one gear tooth during the derived time.

2. The shift control method according to claim 1, further comprising:
    repeating the operating of the AMT to implement the starting stage once the AMT has implemented the neutral stage.

3. The shift control method according to claim 1, further comprising:
    Determining, by the controller, whether the operation of the driving motor affects one or more parts which are not restricted to the input shaft of the AMT in a state in which the AMT implements the neutral stage.

4. The shift control method according to claim 3, wherein if it is determined, by the controller, that the operation of the driving motor affects the one or more parts which are not restricted to the input shaft among parts of the AMT, the driving motor is not operated and implementation of the neutral stage is repeated.

5. The shift control method according to claim 4, wherein when the implementation of the neutral stage is repeated, a synchronizer sleeve included in the AMT is away from the clutch gear.

6. The shift control method according to claim 1, wherein when no change in a stroke of a synchronizer included in the AMT is present, it is determined, by the controller, that the starting stage is not implemented.

7. The shift control method according to claim 1, wherein when the RPM of the driving motor is in the predetermined range, a synchronizer included in the AMT is operated so that the AMT implements the starting stage.

8. The shift control method according to claim 7, wherein when the starting stage is not implemented, it is determined, by the controller, that a synchronizer sleeve forming the synchronizer is in a series state with the clutch gear.

\* \* \* \* \*